United States Patent [19]

Kronmiller

[11] 4,087,196

[45] May 2, 1978

[54] APPARATUS FOR DERIVING ENERGY FROM MOVING GAS STREAMS

[76] Inventor: George John Kronmiller, 433 Millbrook Ave., Randolph, N.J. 07801

[21] Appl. No.: 735,960

[22] Filed: Oct. 27, 1976

Related U.S. Application Data

[63] Continuation-in-part of Ser. No. 632,526, Nov. 17, 1975, abandoned.

[51] Int. Cl.² ............................................. F03D 17/00
[52] U.S. Cl. ............................................ 415/2; 290/55
[58] Field of Search ....................................... 415/2–4, 415/60, 61, 62, 66, 198; 290/43, 44, 54, 55

[56] References Cited

U.S. PATENT DOCUMENTS

| 383,217 | 5/1888 | Fox | 415/198 |
|---|---|---|---|
| 833,184 | 10/1906 | Terzian | 415/2 |
| 981,077 | 1/1911 | Feldner | 415/2 |
| 1,025,428 | 5/1912 | Stanchus | 415/3 |
| 1,186,289 | 6/1916 | Dalen | 415/2 |
| 1,311,193 | 7/1919 | Uecke | 415/68 |
| 1,345,022 | 6/1920 | Oliver | 415/3 |
| 1,783,669 | 12/1960 | Oliver | 415/2 |
| 2,153,523 | 4/1939 | Roberts et al. | 290/44 |
| 2,563,279 | 8/1951 | Rushing | 415/68 |
| 3,883,750 | 5/1975 | Uzzell, Jr. | 290/44 |

FOREIGN PATENT DOCUMENTS

| 516,675 | 4/1921 | France | 415/3 |
|---|---|---|---|
| 935,673 | 6/1948 | France | 415/2 |
| 1,181,926 | 6/1959 | France | 415/68 |
| 249,011 | 3/1926 | United Kingdom | 415/2 |

*Primary Examiner*—C. J. Husar
*Attorney, Agent, or Firm*—James Albert Drobile

[57] ABSTRACT

Apparatus for deriving energy from a moving gas stream, such as an atmospheric air current, and comprising: a rigid body or housing which is generally symmetrical about a single longitudinal axis intended to be oriented in the direction of stream flow, the body or housing defining a longitudinal, coaxial, convergent, frustoconical passageway therethrough for at least a portion of the stream; a gas turbine rotor mounted for rotation about the common axis in a plane rearwardly adjacent the plane of the outlet opening of the passageway in response to the flow of gas through the passageway; an induction fan mounted for rotation about the common axis substantially in the plane of the inlet opening of the passageway; driving means for rotating the induction fan at a fixed speed, or at a variable speed dependent upon gas stream velocity; means for transmitting the rotational energy produced by the turbine rotor; and optional means, such as a generator, for converting the rotational energy into electrical energy.

The body or housing of the apparatus optionally but preferably has a transverse, coaxial, annular, flat or preferably slightly dished or frustoconical exterior wall member extending outwardly from the periphery of the passageway at the outlet opening thereof, and optionally but not preferably may also have a longitudinal, coaxial, cylindrical or preferably slightly-divergent frustoconical exterior wall surface extending downstream from the periphery of the passageway at the inlet opening thereof to a juncture with the transverse annular wall member. The body or housing of the apparatus is optionally mounted for rotation on supporting means and, when so mounted, is optionally but preferably provided with a vane extending radially and longitudinally from the housing, to orient the passageway in the direction of the gas stream flow.

17 Claims, 4 Drawing Figures

APPARATUS FOR DERIVING ENERGY FROM MOVING GAS STREAMS

RELATED APPLICATION

This application is a continuation-in-part of co-pending application, Ser. No. 632,526, filed Nov. 17, 1975, and now abandoned, and directed to an invention or improvement in "Apparatus for Deriving Energy from Moving Gas Streams".

BACKGROUND OF THE INVENTION

1. Field of the Invention

This invention relates to the derivation of energy from relatively slow-moving gas streams such as wind currents, chimney drafts and the like. In particular, it is directed to an improved apparatus adapted to be driven by such a stream and to produce mechanical or electrical energy therefrom.

2. Description of the Prior Art

The most common moving gas streams are wind currents, and machines or apparatus such as windmills, intended to derive energy from such currents, have long been known and used. A principal disadvantage of all known windmills, however, resides in the fact that they are not able to derive energy efficiently from relatively-low-velocity wind currents. Thus, conventional windmills generally are considered not to be useful with wind velocities of seven miles per hour or less.

SUMMARY OF THE INVENTION

Unlike its prior art predecessors, the power-generation apparatus of the present invention is capable of deriving energy efficiently and economically from relatively low-velocity gas streams, including wind currents having a velocity of seven or less miles per hour. This is accomplished in the apparatus of the present invention by the combination of several critical features which cooperate to provide a gas stream velocity of a more than sufficient magnitude across the blades of the conventional windmill turbine rotor regardless of the velocity of the gas stream entering the apparatus. Essential features of the apparatus include the provision of an induction fan in the inlet opening of a convergent frustoconical conduit or passageway through which at least a portion of the moving gas is fed to a turbine rotor mounted adjacent the outlet opening of the conduit. According to the invention this induction fan can be driven either by means connected to the turbine rotor or by means independent thereof. Both the induction fan and the convergent, frustoconical conduit serve to increase substantially the velocity of the gas stream flowing across the turbine rotor. However, in accordance with preferred practice of the present invention, the induction fan is driven by means independent of the turbine and, accordingly, can be used to impart a sufficient gas stream flow across the turbine rotor even if the ambient velocity of the gas stream entering the apparatus is very low. While not intending to be bound by any theory, it is postulated that the use of the induction fan may "induce" a significantly larger "plug" of flowing air to enter the apparatus, thus increasing the energy input from the gas stream. It is this increase in energy input from the gas stream that is believed to provide the overall net beneficial effect of the induction fan.

A preferred but optional feature of the apparatus of the present invention is the provision of a flat, or preferably slightly dished, annular transverse exterior wall member at the downstream end of the apparatus where the channeled gas stream leaves the passageway and flows across the turbine rotor. This transverse wall member, hereinafter sometimes referred to as a "drag annulus" when employed without streamlining, tends to reduce the ambient pressure adjacent the downstream end of the apparatus, and thus serves to contribute to an increase in the velocity of the gas stream flowing over the turbine rotor.

Where the full pressure-reducing effect of the drag annulus is not required, and where it is desirable to "streamline" the apparatus, the housing also may be equipped with a cylindrical or gently-diverging frustoconical longitudinal exterior wall surface over which any adjacent portion of the gas stream not entering the apparatus may flow, such cylindrical or diverging frustoconical exterior wall surface extending from the periphery of the inlet opening of the passageway and rearwardly to the upstream side, or to the outer periphery, of the so-called drag annulus.

The energy derived by the turbine rotor from the moving gas stream can be transmitted and utilized in the form of mechanical energy, or it can be converted into electrical energy through the use of conventional devices, such as an electrical generator, and so used. As previously noted, the induction fan can be driven by means connected to the turbine through suitable power transmission devices, or, and preferably, it can be driven by independent means such as a variable-speed electric motor. When the latter, preferred alternative is employed, the speed of the induction fan can be automatically and continuously varied, in response to changes in the velocity of the ambient gas stream, so as beneficially to provide a gas stream flow of constant velocity across the turbine rotor. The induction fan also can be provided with variable-pitch blades, which can be controlled to achieve the same or a similar result with a fixed-speed motor. In either case, an independent drive means for the induction fan assures a gas flow of sufficient velocity across the rotor of the turbine.

The apparatus of the present invention usually will be provided also with suitable external supporting means, including means permitting the housing to be rotated in a horizontal plane so as to be maintained in the required orientation with respect to the direction of flow of the moving gas stream. The apparatus may but need not be also provided with an appropriate external vane which is responsive to the gas stream and is adapted to maintain the longitudinal axis of the passageway through the housing parallel to the direction of gas stream flow. Alternatively, suitable directional orientation of the housing can be maintained by other suitable drive means, such as an electric motor and appropriate linkages, which are responsive to changes in the direction of the ambient gas stream flow.

It also is contemplated that the apparatus of the present invention can be installed in a stationary manner in a gas stream having a fixed direction of flow. For example, the apparatus can be installed in a flue or chimney, and there be employed to derive useful energy from the uni-directional flow of gases therein.

Other advantages and applications of the apparatus of the present invention will become apparent from the following detailed description of the invention which is to be read in conjunction with the accompanying drawings.

Figure 1:
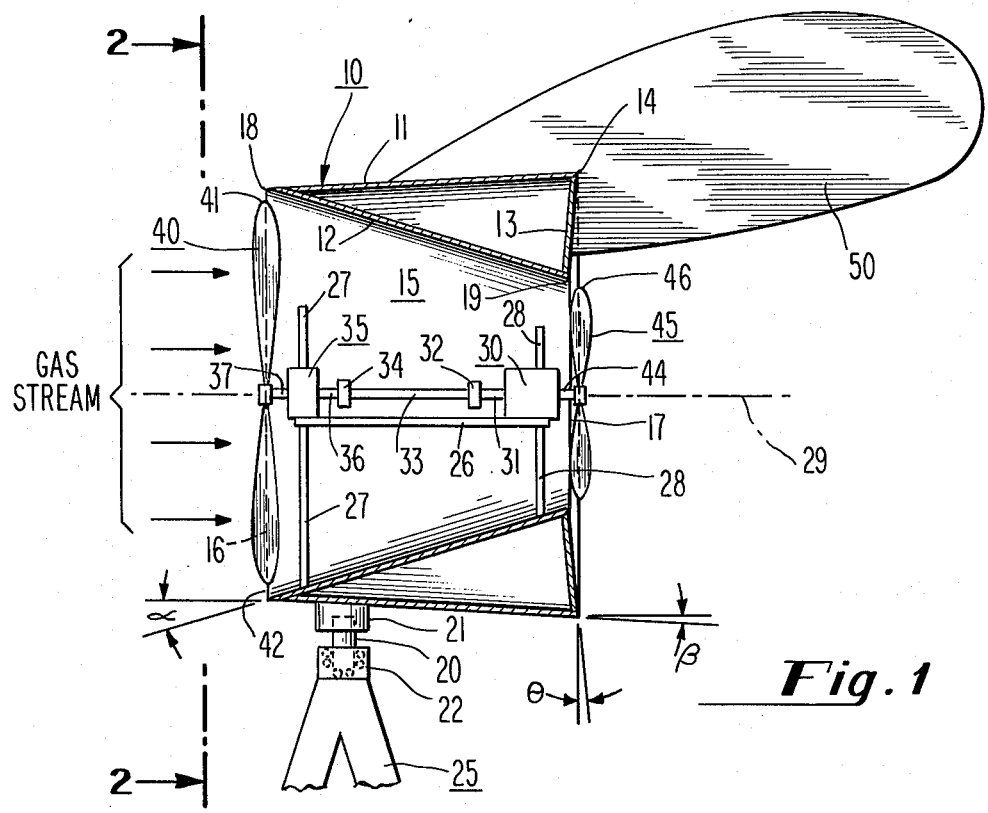
FIG. 1 is a somewhat diagrammatic sectional side view of an apparatus in accordance with the present invention for deriving energy from moving gas streams.

DETAILED DESCRIPTION OF THE INVENTION (including description of a preferred embodiment)

The improved power-generation apparatus of the present invention essentially comprises a rigid body or housing generally symmetrical about a single longitudinal axis and having a central, longitudinal, convergent conduit or passageway formed by a frustoconical interior wall surface around that axis and through which at least a portion of the moving gas stream is conducted. The housing optionally but preferably includes a transverse, coaxial, flat or preferably slightly dished or frustoconical annular exterior wall member extending outwardly from the conduit outlet at its downstream end, and may also include an optional longitudinal, coaxial, cylindrical or preferably slightly-divergent frustoconical, exterior wall surface extending between the upstream end of the conduit to the transverse wall member at the downstream end of the apparatus, and over which any adjacent portion of the gas stream not entering the conduit may pass. This longitudinal, exterior wall surface of the housing, when provided, and the convergent interior wall surface of the housing which forms the central gas passageway, join along the line of their common periphery at the inlet opening of the passageway to form a leading edge at the upstream end of the apparatus. These same surfaces are bridged or joined at their downstream ends by the transverse exterior wall member, which may extend outwardly beyond the longitudinal exterior wall surface when the latter is provided.

The ratio of the cross-sectional area of the inlet opening to the conduit at the upstream end of the housing, to the cross-sectional area of the outlet opening to the conduit at the downstream end of the housing, is referred to as the "Wind Multiplier Ratio". The specification of a suitable value for this ratio is essential to the successful practice of the invention. Thus, it has been found that a Wind Multiplier Ratio of approximately three to one (3:1) gives excellent results and therefore is preferred, although a ratio in the range of from about one and one-quarter to one (1.25:1) to about four to one (4:1) gives good results and may be employed. With a Wind Multiplier Ratio of three to one (3:1), it will be seen that the ratio of the diameter of the inlet opening of the conduit to the diameter of the outlet opening of the conduit will be equal to the square root of three, or approximately one and three-quarters to one (1.75:1).

The degree of convergence of the central conduit or passageway may vary over a rather limited range. In general, it has been determined that an angle of convergence between the longitudinal interior wall surface and the central axis of the housing in the range of from about five to about twenty degrees gives satisfactory results and is suitable, while an angle of convergence of about fifteen degrees has been found to give better results and is preferred. Similarly, the degree of divergence of the longitudinal exterior wall surface of the housing, when provided, with the common longitudinal axis can vary within a range of from about zero degrees (i.e., a cylindrical configuration) to about seven degrees, with an angle of divergence of about two and one-half degrees being found to be optimum and therefore preferable. With respect to the transverse, annular, exterior member at the downstream end of the housing, it has been found that an angle of deflection, preferably in an upstream direction, from a plane at right angles to the common longitudinal axis, in the range of from about zero degrees (i.e., a flat configuration) to about five degrees will give satisfactory results, although an angle of deflection of about five degrees has been found to give superior results and is preferred.

The ratio of the outside diameter to the inside diameter for the transverse, annular, exterior wall member at the downstream end of the housing preferably is about 2:1, although a ratio in the range of from about 1.75:1 to about 2.5:1 gives satisfactory results and can be employed. It should be noted that this limitation applies particularly where the housing does not include a cylindrical or slightly divergent longitudinal exterior wall surface, i.e., where the transverse member functions as a drag annulus. Where such a wall surface is provided, the transverse exterior wall member may terminate at its juncture with the longitudinal exterior surface, or it may extend outwardly therebeyond.

As noted hereinabove, an induction fan is mounted for driven rotation about the common longitudinal axis in a transverse plane which is substantially in the transverse plane of the inlet opening of the conduit. A turbine rotor is mounted for free rotation, in response to the flow of gas through the conduit, around the common longitudinal axis in a transverse plane which is parallel and rearwardly adjacent to the transverse plane of the outlet opening of the conduit. When the transverse exterior wall member of the housing is inwardly dished, the turbine rotor is mounted to rotate substantially in the transverse plane of the downstream end of the transverse exterior wall member of the housing. Alternatively, when the transverse exterior wall member is flat, the turbine rotor is mounted to rotate in a transverse plane which is rearwardly adjacent the transverse plane of the transverse exterior wall member of the housing. In general, the set-back of the plane of rotation of the turbine rotor from the plane of the outlet opening of the gas stream conduit will vary from about one-half inch for small apparatus to about 6 inches or more for large apparatus.

Figure 2:
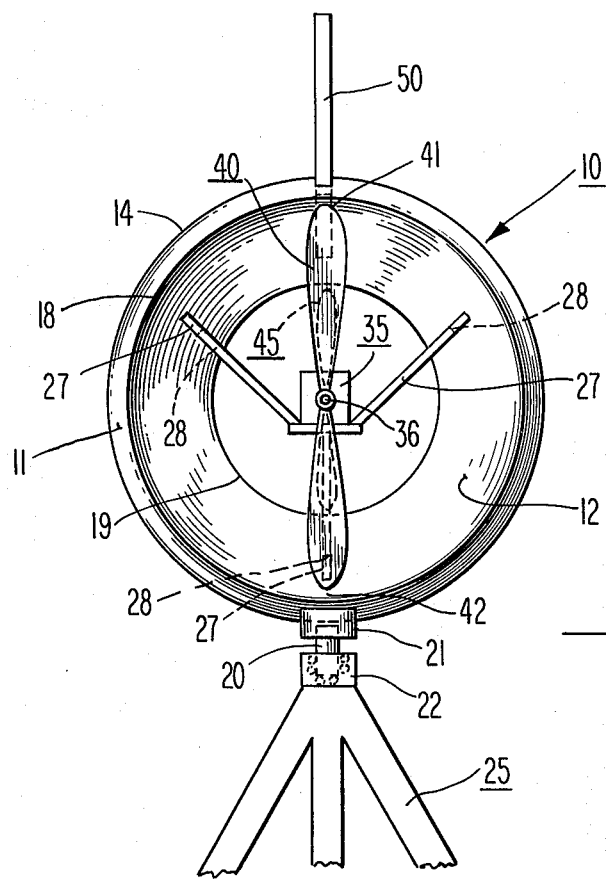
FIG. 2 is an end view of the device of FIG. 1, taken along line 2—2 of FIG. 1.

FIGS. 1 and 2 illustrate one specific embodiment of the apparatus of the present invention. In FIGS. 1 and 2, wherein like reference numbers designate like parts, the power-generation apparatus comprises essentially a housing 10 which conveniently can be constructed from available materials such as sheet metal, cast metal, plastic or the like. Housing 10 is shown as being generally symmetrical in longitudinal cross-section around a common longitudinal axis 29. Housing 10 has a coaxial, longitudinal, convergent frustoconical interior wall surface 12, a coaxial, longitudinal, slightly divergent frustoconical exterior wall surface 11, and a coaxial, transverse, slightly inwardly-dished, frustoconical, annular, exterior wall surface 13. Wall surfaces 11 and 12 are joined at the upstream end of the apparatus along their line of intersection at a common periphery to form leading edge 18 defining inlet opening 16, and are joined at the downstream end of the apparatus by exterior wall surface 13 to form peripheral trailing edges 14 and 19, the latter edge defining outlet opening 17. The interior wall surface 12 of housing 10 defines a central, longitudinal, coaxial, convergent frustoconical conduit 15 through which is conducted at least a portion of the ambient gas stream.

The Wind Multiplier Ratio of the apparatus illustrated in FIGS. 1 and 2 is three to one (3:1). The angle of convergence of interior wall surface 12 with the longitudinal central axis 29 (this angle being designated $\alpha$ in FIG. 1) is fifteen degrees (15°). The angle of divergence of exterior wall surface 11 with the same axis (this angle being designated $\beta$ in FIG. 1) is two and one-half degrees ($1\frac{1}{2}$°). The angle of inward deflection of annular exterior wall surface 13 from the plane perpendicular to the same axis (this angle being designated $\theta$ in FIG. 1) is five degrees (5°).

As shown in FIG. 1, the apparatus of the invention essentially includes a turbine rotor 45 mounted on shaft 44 which is coaxial with the common longitudinal axis 29. Turbine rotor 45 is shown as a conventional, high-speed, two-bladed, propeller-type rotor. The blades of rotor 45 have a small pitch angle and a thin airfoil section. Turbine rotor 45 is shown as being mounted for rotation in a transverse plane including the trailing edge 14 of housing 10, and which is rearwardly adjacent and parallel to the transverse plane including edge 19 and the outlet opening 17 of conduit 15. The tip 46 of turbine rotor 45 is shown as being substantially of the same radius as the outlet opening 17 of conduit 15.

Shaft 44 from turbine rotor 45 is shown as connected to energy conversion means 30, which typically will consist of a conventional electric generator or dynamo for converting the rotational energy transmitted by shaft 44 into electrical energy. Means (not shown) also are provided for transmitting such electrical energy to a remote location for utilization and/or storage. Alternatively, a system of pulleys, gears or the like may be provided for transmitting the rotational energy delivered by shaft 44 in the form of mechanical energy to a remote point of utilization. In FIG. 1, energy conversion means 30 is shown as having an outlet shaft 31 connected through coupling element 32 to transfer shaft 33, and thence through coupling element 34 to shaft 36 driving speed conversion means 35. As shown in FIG. 1, the outlet shaft 37 from speed conversion means 35 has mounted thereon induction fan 40, which is adapted for rotation substantially in the transverse plane including leading edge 18 and the inlet opening 16 of conduit 15. The tip 41 of induction fan 40 is shown as having a radius slightly less than the radius of the inlet opening 16 to conduit 15 formed by leading edge 18 of housing 10.

In FIG. 1, housing 10 also is shown as including platform means 26 for supporting the assemblage comprising turbine rotor 45, conversion means 30, speed reducing means 35 and induction fan 40, together with connecting shafts 31, 33 and 36 and coupling elements 32 and 34. Platform 26 is shown in FIG. 1 as being supported by radial struts 27 inwardly adjacent the inlet opening 16 of conduit 15, and by radial struts 28 inwardly adjacent the outlet opening 17 of conduit 15. Three such struts, separated by approximately 120°, are shown at each location.

In FIGS. 1 and 2, the apparatus of the invention is shown as being pivotally mounted, for rotation in a horizontal plane, to conventional and illustrative support means 25 through fixed collar 21, pivot pin 20 and thrust bearing 22. Also, the apparatus as illustrated in FIGS. 1 and 2 is shown as being provided with vane 50 which extends radially and longitudinally in a rearward direction from the exterior of housing 10. When the apparatus is rotatably mounted as shown in FIGS. 1 and 2, vane 50 acts to change the directional orientation of the apparatus in response to changes in the direction of gas stream flow so that the central axis 29 of passageway 15 always remains substantially parallel to the direction of the gas stream flow.

The apparatus illustrated in FIGS. 1 and 2 now will be described with respect to its mode of operation. A moving gas stream traveling in the direction shown will be divided, upon reaching the upstream end of housing 10, into a portion which is diverted and conducted through conduit 15, and a portion which flows along and over the longitudinal exterior surface 11 of the apparatus. The portion of the gas stream flowing through the convergent, frustoconical passage 15 will have its velocity increased by a multiplying factor approximately equal to the ratio of the area of the inlet opening 16 of the passageway 15 to the area of the outlet opening 17 of the passageway, i.e., by the so-called Wind Multiplier Ratio. Thus, with a Wind Multiplier Ratio of 3.0, the velocity of the gas stream entering the inlet opening 16 of passageway 15 will have its velocity increased approximately three-fold by the time it reaches the outlet opening 17 of the passageway 15 and the face of turbine rotor 45. In passing over and through turbine rotor 45, the turbine rotor is caused to rotate and develop rotational energy which is transmitted through shaft 44 to conversion means 30, which it is transmitted at least in part as mechanical energy through outlet shaft 31, and converted at least in part into electrical energy and transmitted (by means not shown) to a remote location for utilization. As noted, at least a portion of the rotational energy entering conversion means 30 through shaft 44 is transmitted through shaft 31, coupling 32, shaft 33, coupling 34, and shaft 36 to speed conversion means 35. In the apparatus shown in FIG. 1, the speed conversion means 35 is a speed reducing means. The outlet shaft 37 from speed reducing means 35 is connected to induction fan 40 and serves to drive such fan at a reduced rotational speed. Through the rotation of induction fan 40 by means of rotational energy transmitted from the turbine rotor 45, an additional increment of velocity is added to the gas stream entering the housing 10 and conduit 15. Thus, in the apparatus illustrated in FIGS. 1 and 2, the speed reducing means 35 is geared so as to cause induction fan 40 to rotate at a speed which will impart an additional five to fifteen miles per hour to the speed of entering gas stream under existing ambient conditions. This novel means for enhancing the velocity of the entering gas stream permits the apparatus of the present invention to provide a gas stream velocity across turbine rotor 45 of sufficient magnitude to efficiently generate power substantially regardless of the ambient gas stream velocity.

As noted above, induction fan 40 also can be, and preferably is, driven by means independent of turbine rotor 45. In such event, the independent driving means can be so constituted as to be responsive automatically to changes in the velocity of the ambient gas stream, and thus to permit of maintaining a constant velocity in the gas stream passing over turbine rotor 45. When this latter and preferred alternative is practiced, it will be apparent that at least shaft 44, for turbine rotor 45, and conversion means 30 may conveniently be mounted external of housing 10.

It should also be noted that, while the slight divergence of longitudinal exterior wall surface 11 and the slight inward deflection of transverse exterior wall surface 13 are taught as not being essential to the successful practice of this invention, such alternatives nevertheless are preferred characteristics of the apparatus of this invention as illustrated in FIGS. 1 and 2. This is for the reason that both features, i.e., the slight divergence of longitudinal exterior wall surface 11 and the slight inward deflection of transverse exterior wall surface 13, contribute to producing a reduced ambient pressure adjacent to and downstream of the outlet opening 17 of conduit 15. This reduced pressure serves to further increase the velocity of the gas stream flowing over turbine rotor 45.

Figure 3:
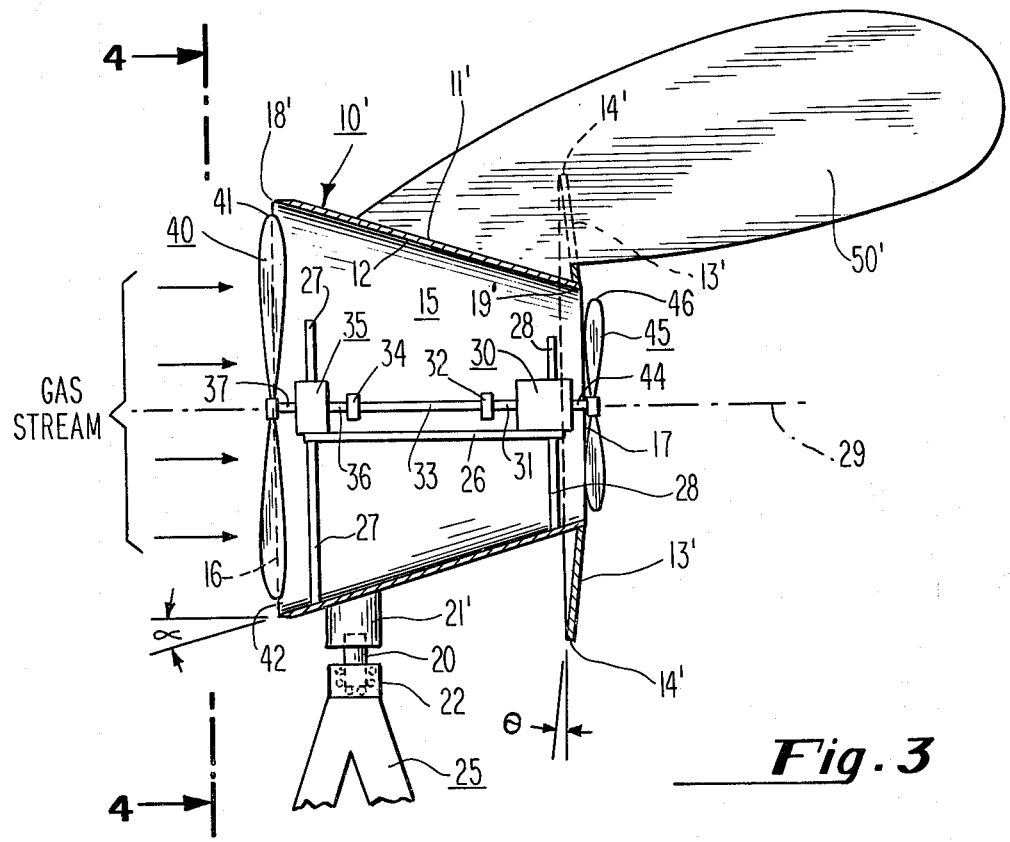
FIG. 3 is a somewhat diagrammatic sectional side view of another and preferred embodiment of an apparatus in accordance with the present invention.
Figure 4:
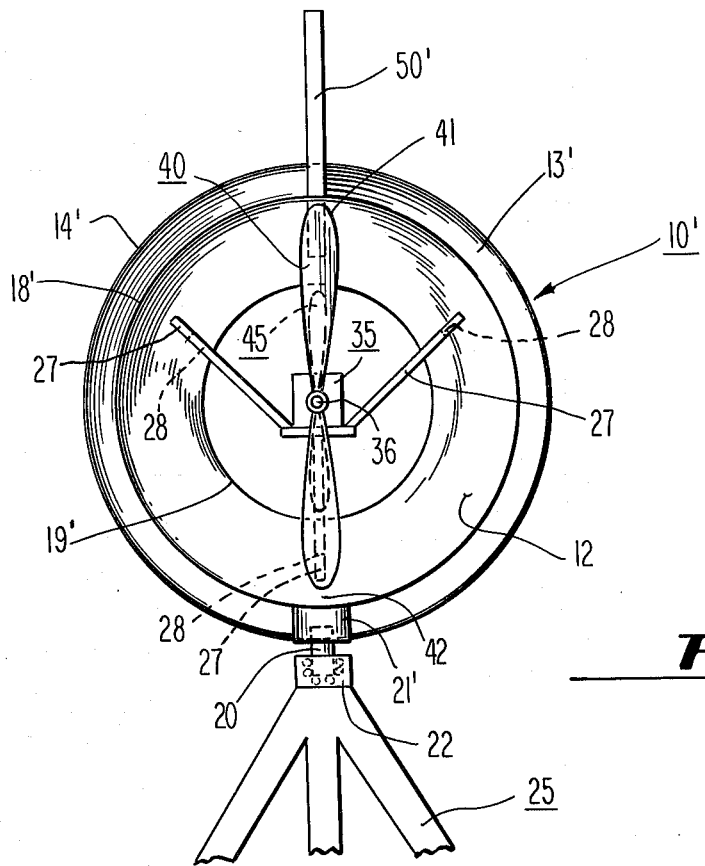
FIG. 4 is an end view of the device of FIG. 3 taken along line 4—4 of FIG. 3.

FIGS. 3 and 4 illustrate yet another and preferred embodiment of the apparatus of the present invention. In FIGS. 3 and 4, like reference numbers designate like parts. Furthermore, a reference number in FIGS. 3 and 4 that is the same as a reference number in FIGS. 1 and 2 designates the same corresponding part in all of those figures, and a reference number in FIGS. 3 and 4 that carries an accent mark (e.g., "50'") designates a part that is equivalent functionally even if not in design to the part carrying the same reference number without the accent mark (e.g., "50") in FIGS. 1 and 2.

In FIGS. 3 and 4, the power-generation apparatus comprises essentially a housing 10' which conveniently can be constructed from available materials such as sheet metal, cast metal, plastic or the like. Housing 10' is shown as being generally symmetrical in longitudinal cross-section around a common longitudinal axis 29. Housing 10' has a coaxial, longitudinal, convergent frustoconical interior wall surface 12, a coaxial, longitudinal, convergent frustoconical exterior wall surface 11', and a coaxial, transverse, slightly dished or frustoconical, annular, exterior wall member 13'. As shown in FIG. 3, wall surfaces 11' and 12 are the reverse sides of a single wall means fabricated from a suitable sheet material, which wall means at the upstream end of the apparatus forms leading edge 18' defining inlet opening 16, and at the downstream end of the apparatus forms trailing edge 19' defining outlet opening 17. The outer periphery of transverse wall member 13' forms trailing edge 14' of housing 10'. The interior wall surface 12 of housing 10' defines a central, longitudinal, coaxial, convergent frustoconical conduit 15 through which is conducted at least a portion of the ambient gas stream.

The Wind Multiplier Ratio of the apparatus illustrated in FIGS. 3 and 4 is three to one (3:1). The angle of convergence of interior wall surface 12 with the longitudinal central axis 29 (this angle being designated α in FIG. 3) is 15°. The angle of convergence of exterior wall surface 11' with the same axis is the same, i.e., 15°. The angle of upstream deflection of annular exterior wall member 13' from the plane perpendicular to the same axis (this angle being designated θ in FIG. 3) is 5°. The ratio of the outer diameter of transverse wall surface 13' to its inner diameter is two to one (2:1).

As shown in FIG. 3, the apparatus of the invention essentially includes a turbine rotor 45 mounted on shaft 44 which is coaxial with the common longitudinal axis 29. Turbine rotor 45 is shown as a conventional, high-speed, two-bladed, propeller-type rotor. The blades of rotor 45 have a small pitch angle and a thin airfoil section. Turbine rotor 45 is shown as being mounted for rotation in a transverse plane which is rearwardly adjacent and parallel to the transverse plane including trailing edge 19' and the outlet opening 17 of conduit 15. The tip 46 of turbine rotor 45 is shown as being substantially of the same radius as the outlet opening 17 of conduit 15.

Shaft 44 from turbine rotor 45 is shown as connected to energy conversion means 30, which typically will consist of a conventional electric generator or dynamo for converting the rotational energy transmitted by shaft 44 into electrical energy. Conventional means (not shown) also are provided for transmitting such electrical energy to a remote location for utilization and/or storage. Alternatively, a conventional system of pulleys, gears or the like may be provided for transmitting the rotational energy delivered by shaft 44 in the form of mechanical energy to a remote point of utilization. In FIG. 3, energy conversion means 30 is shown as having an outlet shaft 31 connected through coupling element 32 to transfer shaft 33, and thence through coupling element 34 to shaft 36 driving speed conversion means 35. As shown in FIG. 3, the outlet shaft 37 from speed conversion means 35 has mounted thereon induction fan 40, which is adapted for rotation substantially in the transverse plane including leading edge 18' and the inlet opening 16 of conduit 15. The tip 41 of induction fan 40 is shown as having a radius slightly less than the radius of the inlet opening 16 to conduit 15 formed by leading edge 18' of housing 10'.

In FIG. 3, housing 10' also is shown as including platform means 26 for supporting the assemblage comprising turbine rotor 45, conversion means 30, speed reducing means 35 and induction fan 40, together with connecting shafts 31, 33 and 36 and coupling elements 32 and 34. Platform 26 is shown in FIG. 3 as being supported by radial struts 27 inwardly adjacent the inlet opening 16 of conduit 15, and by radial struts 28 inwardly adjacent the outlet opening 17 of conduit 15. Three such struts, separated by approximately 120°, are shown at each location.

In FIGS. 3 and 4, the apparatus of the invention is shown as being pivotally mounted, for rotation in a horizontal plane, to conventional and illustrative support means 25 through fixed collar 21', pivot pin 20 and thrust bearing 22. Also, the apparatus as illustrated in FIGS. 3 and 4 is shown as being provided with vane 50' which extends radially and longitudinally in a rearward direction from the exterior of housing 10'. When the apparatus is rotatably mounted as shown in FIGS. 3 and 4, vane 50' acts to change the directional orientation of the apparatus in response to changes in the direction of gas stream flow so that the central axis 29 of passageway 15 always remains substantially parallel to the direction of the gas stream flow.

The apparatus illustrated in FIGS. 3 and 4 now will be described with respect to its mode of operation. A moving gas stream traveling in the direction shown will be divided, upon reaching the upstream end of housing 10', into a portion which is diverted and conducted through conduit 15, and a portion which flows along and over the longitudinal exterior surface 11' of the apparatus. The portion of the gas stream flowing through the convergent, frustoconical passage 15 will have its velocity increased by a multiplying factor approximately equal to the ratio of the area of the inlet opening 16 of the passageway 15 to the area of the outlet opening 17 of the passageway, i.e., by the so-called Wind Multiplier Ratio. Thus, with a Wind Multiplier Ratio of 3.0, the velocity of the gas stream entering the inlet opening 16 of passageway 15 will have its velocity increased approximately three-fold by the time it reaches the outlet opening 17 of the passageway 15 and the face of turbine rotor 45. In passing over and through turbine rotor 45, the turbine rotor is caused to rotate and develop rotational energy which is transmitted through shaft 44 to conversion means 30, where it is transmitted at least in part as mechanical energy through outlet shaft 31, and converted at least in part into electrical energy and transmitted (by means not shown) to a remote location for utilization. As noted, at least a portion of the rotational energy entering conversion means 30 through shaft 44 is transmitted through shaft 31, coupling 32, shaft 33, coupling 34, and shaft 36 to speed conversion means 35. In the apparatus shown in FIG. 3, the speed conversion means 35 is a speed reducing means. The outlet shaft 37 from speed reducing means 35 is connected to induction fan 40 and serves to drive such fan at a reduced rotational speed. Through the rotation of induction fan 40 by means of rotational energy transmitted from the turbine rotor 45, an additional increment of velocity is added to the gas stream entering the housing 10' and conduit 15. Thus, in the apparatus illustrated in FIGS. 3 and 4, the speed-reducing means 35 is geared so as to cause induction fan 40 to rotate at a speed which will impart an additional five to fifteen miles per hour to the speed of entering gas stream under existing ambient conditions. This novel means for enhancing the velocity of the entering gas stream permits the apparatus of the present invention to provide a gas stream velocity across turbine rotor 45 of sufficient magnitude to efficiently generate power substantially regardless of the ambient gas stream velocity.

As noted above, induction fan 40 also can be, and preferably is, driven by means independent of turbine rotor 45. In such event, the independent driving means can be so constituted as to be responsive automatically to changes in the velocity of the ambient gas stream, and thus to permit of maintaining a constant velocity in the gas stream passing over turbine rotor 45. When this latter and preferred alternative is practiced, it will be apparent that at least shaft 44, for turbine rotor 45, and conversion means 30 may conveniently be mounted external of housing 10'.

It should also be noted that, while the use of the transverse exterior wall member shown in FIG. 3 as 13' without the divergent longitudinal exterior wall surface shown in FIG. 1 as 11, and the slight upstream deflection of transverse exterior wall member 13', are taught as not being essential to the successful practice of this invention, such alternatives nevertheless are distinctly preferred characteristics of the apparatus of this invention. This is for the reason that both features, i.e., the drag annulus 13' and the slight upstream deflection of that drag annulus, contribute to producing a substantially reduced ambient pressure adjacent to and downstream of the outlet opening 17 of conduit 15. This reduced pressure serves to further and substantially increase the velocity of the gas stream flowing over turbine rotor 45.

While the power generation apparatus of the present invention has been described in detail with reference to particular and preferred embodiments, it is apparent that the disclosed embodiments can be modified in many ways through the use of substantially equivalent structures and means without departing from the broad concept of the present invention. It is therefore to be clearly understood that all such modifications in structures and means are contemplated and intended as falling within the scope of the present invention.

The invention claimed is:

1. An apparatus for power generation adapted to be driven by a moving gas stream and comprising:
   (a) A rigid housing including a common longitudinal axis and having a coaxial longitudinal frustoconical interior wall surface defining a central convergent conduit through said housing for at least a portion of the moving gas stream, said conduit having an inlet opening at the upstream end of said housing and an outlet opening at the downstream end of said housing;
   (b) A turbine rotor mounted for free rotation about said common axis in a plane rearwardly adjacent the plane of said outlet opening of said conduit and in response to the flow of gas thereover;
   (c) An induction fan mounted for driven rotation about said common axis substantially in the plane of said inlet opening of said conduit;
   (d) Means for driving said induction fan; and
   (e) Power transmission means connected to said turbine rotor for transmitting the mechanical energy generated by said turbine rotor during rotation.

2. Apparatus according to claim 1, wherein the ratio of the cross-sectional area of said inlet opening to the cross-sectional area of said outlet opening is in the range of from about 1.25:1 to about 4:1.

3. Apparatus according to claim 1, wherein the angle of convergence of said interior wall surface with said common axis is in the range of from about 5° to about 20°.

4. Apparatus according to claim 1, wherein said housing also has at its downstream end a coaxial transverse annular wall member beginning at an inner peripheral edge which is common to the interior wall surface at said outlet opening and extending outwardly to an outer terminal peripheral edge.

5. Apparatus according to claim 4, wherein said transverse annular wall member is frustoconical and is slightly deflected in the upstream direction.

6. Apparatus according to claim 5, wherein the angle of upstream deflection of said transverse annular wall member from a plane at right angles to said common axis is in the range of from about 0° to about 5°.

7. Apparatus according to claim 4, wherein the ratio of the diameter of the outer peripheral edge of said transverse annular wall member to the diameter of its inner peripheral edge is in the range of from about 1.75:1 to about 2.5:1.

8. Apparatus according to claim 4, wherein said housing also has a coaxial longitudinal exterior wall surface extending from a terminal peripheral edge which is common to said interior wall surface at the inlet opening at the upstream end of said housing in a downstream direction to a peripheral juncture with said transverse annular wall member at the downstream end of said housing.

9. Apparatus according to claim 8, wherein said longitudinal exterior wall surface is frustoconical and slightly divergent in the downstream direction.

10. Apparatus according to claim 9, wherein the angle of divergence of said frustoconical longitudinal exterior wall surface with said common axis is in the range of from about 0° to about 7°.

11. Apparatus according to claim 1 and including means connected to said power transmission means for converting the mechanical energy derived from said turbine rotor into electrical energy.

12. Apparatus according to claim 1, wherein said means for driving said induction fan includes means for transmitting power derived from said turbine rotor.

13. Apparatus according to claim 1, wherein said means for driving said induction fan are independent of said turbine rotor.

14. Apparatus according to claim 13, wherein said independent means for driving said induction fan include means adapted to vary the rotational speed of said induction fan.

15. Apparatus according to claim 14, wherein said means adapted to vary the rotational speed of said induction fan are adapted to be responsive to changes in the speed of the gas stream impinging on said fan.

16. Apparatus according to claim 1 and including support means for said housing adapted to permit rotation thereof about a vertical axis perpendicular to said common longitudinal axis.

17. Apparatus according to claim 16 and including a radial, vertical, longitudinally-extended vane connected to the exterior of said housing and adapted to directionally orient said conduit in response to gas stream flow.

* * * * *